United States Patent
Wagner et al.

(10) Patent No.: US 12,405,130 B2
(45) Date of Patent: Sep. 2, 2025

(54) METHOD FOR MATCHING A DIGITAL ROAD MAP

(71) Applicant: Robert Bosch GmbH, Stuttgart (DE)

(72) Inventors: Andre Wagner, Hannover (DE); Erik Einhorn, Sarstedt (DE); Julian Lindner, Hannover (DE); Matthias Roland, Hildesheim (DE); Maurice Seer, Elze (DE); Nicolas Fischer, Hannover (DE); Pierre Lothe, Hildesheim (DE); Tobias Ritter, Hildesheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 140 days.

(21) Appl. No.: 18/499,295

(22) Filed: Nov. 1, 2023

(65) Prior Publication Data

US 2025/0137810 A1  May 1, 2025

(30) Foreign Application Priority Data

Nov. 28, 2022  (DE) ...................... 10 2002 212 704.8

(51) Int. Cl.
  *G06V 20/56* (2022.01)
  *G01C 21/00* (2006.01)
(52) U.S. Cl.
  CPC ................................ *G01C 21/3822* (2020.08)
(58) Field of Classification Search
  CPC ................ G01C 21/30; G01C 21/3822; G06V 10/225; G06V 10/457; G06V 10/75; G06V 20/588
  See application file for complete search history.

(56) References Cited

U.S. PATENT DOCUMENTS

| | | | |
|---|---|---|---|
| 10,710,599 B2 | 7/2020 | Nobre et al. | |
| 2006/0045337 A1* | 3/2006 | Shilman | G06V 30/18029 382/181 |
| 2007/0122041 A1* | 5/2007 | Moghaddam | G06F 18/2132 382/206 |

(Continued)

FOREIGN PATENT DOCUMENTS

DE  102015214338 A1  2/2017

OTHER PUBLICATIONS

Neira et al., "Data Association in Stochastic Mapping Using the Joint Compatibility Test," IEEE Transactions on Robotics and Automation, vol. 17, No. 6, 2001, pp. 890-897. <https://sci-hub.ru/10.1109/70.976019> Downloaded Oct. 31, 2023.

*Primary Examiner* — Matthew J. Reda
(74) *Attorney, Agent, or Firm* — NORTON ROSE FULBRIGHT US LLP

(57) ABSTRACT

A method for matching a digital road map to a digital reference road map, wherein the two road maps in each case include semantic information about objects represented on the two road maps. The method includes: associating objects on the road map with objects on the reference road map on the basis of the respective semantic information such that only objects with the same semantic information are associated with one another; matching the road map to the reference road map on the basis of the association, wherein the matching comprises creating a delta pose between the road map and the reference road map. A device, a computer program, and a machine-readable storage medium are also described.

8 Claims, 3 Drawing Sheets

(56) References Cited

U.S. PATENT DOCUMENTS

2011/0205338 A1\* 8/2011 Choi .................... G06T 7/74
                                                                348/46
2018/0121763 A1\* 5/2018 Surnilla ............ G06V 10/809
2019/0084577 A1\* 3/2019 Nobre ............ B60W 50/0097

\* cited by examiner

METHOD FOR MATCHING A DIGITAL ROAD MAP

CROSS REFERENCE

The present application claims the benefit under 35 U.S.C. § 119 of German Patent Application No. DE 10 2022 212 704.8 filed on Nov. 28, 2022, which is expressly incorporated herein by reference in its entirety.

FIELD

The present invention relates to a method for matching a digital road map to a digital reference road map, a device, a computer program, and a machine-readable storage medium.

BACKGROUND INFORMATION

U.S. Pat. No. 10,710,599 B2 describes a method for detecting a change in a digital map.

German Patent Application No. DE 10 2015 214 338 A1 describes a method for determining arrangement information for a vehicle. The arrangement information comprises a position of the vehicle and an orientation of the vehicle in relation to a stationary coordinate system.

SUMMARY

A problem addressed by the invention is that of providing efficient matching of a digital road map to a digital reference road map.

This problem may be solved by features of the present invention. Advantageous embodiments of the present invention are disclosed herein.

According to a first aspect of the present invention, a method for matching a digital road map to a digital reference road map is provided, wherein the two road maps in each case include semantic information about objects represented in the two road maps. According to an example embodiment of the present invention, the method comprises the following steps:

associating objects on the road map with objects on the reference road map on the basis of the respective semantic information such that only objects with the same semantic information are associated with one another, matching the road map to the reference road map on the basis of the association, wherein the matching comprises creating a delta pose between the road map and the reference road map.

According to a second aspect of the present invention, a device is provided which is configured to carry out all steps of the method according to the first aspect of the present invention.

According to a third aspect of the present invention, a computer program is provided which comprises instructions which, when the computer program is executed by a computer, for example by the device according to the second aspect of the present invention, cause this computer to carry out a method according to the first aspect of the present invention.

According to a fourth aspect of the present invention, a machine-readable storage medium is provided on which the computer program according to the third aspect of the present invention is stored.

The present invention is based on and includes the finding that semantic information about objects represented on the two road maps may be used to match the digital road map to a digital reference road map. It is envisaged that only objects with the same semantic information are associated with one another. This means that objects with different semantic information will not be associated with one another. On the basis of the associated objects, the road map is matched to the reference road map. The road map can thus be efficiently matched to the reference road map.

The concept described here can thus be used in particular within the context of a SLAM method. Here "SLAM" stands for "simultaneous localization and mapping". Object association is an important aspect in the SLAM method and in "computer vision". Known methods are based on the fact that the association between object pairs is independent. Here, results may occur which contain some misassociations, due to a matched or associated object pair not being consistent with the overall matching hypothesis. This can lead to bad delta-pose hypotheses.

Since, according to the present invention disclosed herein, the semantic information is used in matching, i.e., in associating, it can be efficiently ensured that only objects with the same semantics are matched to one another, i.e., are associated with one another. This means that, e.g., a dashed line is not matched to or associated with a solid line.

In one example embodiment of the method of the present invention, it is provided that the two road maps in each case include geometric information about the objects represented on both road maps, wherein, on the basis of the respective geometric information, the objects on the road map are associated with objects on the reference road map.

This results, e.g., in ae technical advantage that the objects can be efficiently associated. According to this embodiment of the present invention, it is thus provided that geometric information regarding the objects is used for the association. For example, it is provided that only objects with the same geometric information are associated with one another.

Geometric information includes, e.g., one or more of the following items of information: size, length, width, height, depth, shape.

In one example embodiment of the method of the present invention, it is provided that a distance, in particular an average distance, between an object on the road map and an object on the reference road map is determined, wherein the determined distance, in particular the determined average distance, is compared with a prespecified distance threshold value, wherein the two objects are only associated when the determined distance, in particular the determined average distance, is less than or less than/equal to the prespecified distance threshold value.

This results, e.g., in the technical advantage that the two objects can be efficiently associated. Objects are thus associated only if, e.g., the average distance between them does not exceed a certain threshold, the prespecified distance threshold value.

In the ideal case, with identical objects, the distance should be zero. By specifying a prespecified distance threshold value and specifying that the two objects will only be associated when the determined distance is less than or less than/equal to the prespecified distance threshold value, inaccuracies on the road map or on the reference road map as compared to the real world can be efficiently taken into account.

In one example embodiment of the method of the present invention, it is provided that the association is carried out by running a branch-and-bound-based algorithm.

This results, e.g., in the technical advantage that the objects can be efficiently associated.

According to this embodiment of the present invention, it is therefore provided that a branch-and-bound method is initiated or executed. In other words, it is provided e.g. that, in order to carry out matching, i.e. associating, a branch-and-bound-based algorithm is used.

Such an algorithm is efficient with regard to object association or to matching.

In one example embodiment of the method of the present invention, it is provided that, when the branch-and-bound-based algorithm is being executed, a cardinality of a matching process is increased at each iteration. The cardinality of the matching is defined, for example, as the number of associated feature pairs (for example, when a total of 4 line pairs is associated, the hypothesis will have a cardinality of 4).

This results, e.g., in a technical advantage that the algorithm can be executed efficiently.

In one example embodiment of the method of the present invention, it is provided that, when the branch-and-bound-based algorithm is being executed, it is tested whether a hypothesis passes a prespecified joint compatibility test, wherein the corresponding branch in the branch-and-bound-based algorithm is pursued on the basis of a test result of the joint compatibility test. The joint compatibility test is a conditionally dependent mathematical test that evaluates the alignment result, i.e. the matching result. In contrast to other tests, it is de-dimensionalized, so that the quality of hypotheses of the most varied cardinality can be compared with one another. The joint compatibility test is, for example, described in "Data Association in Stochastic Mapping using the Joint Compatibility Test," by Jose Neira, Juan D. Tardo; IEEE Trans. Robot. Autom. 17 (6), 890-897.

This may result, e.g., in a technical advantage that the algorithm can be executed efficiently.

In one example embodiment of the method of the present invention, it is provided that the valid hypothesis with the greatest cardinality is determined as an optimal matching result.

This may result, e.g., in a technical advantage that the valid hypothesis can be determined efficiently. Due to such a hypothesis that maximizes the number of the associated feature pairs, an efficient criterion is for evaluating alignment qualities.

In one example embodiment of the method of the present invention, it is provided that if a plurality of valid hypotheses maximize cardinality, the hypothesis with the greatest confidence is determined as an optimal matching result.

This may result, e.g., in a technical advantage that, in the event of a comparable quality of a plurality of hypotheses, there will be an additional tie-breaker criterion, i.e. a decision criterion, in order to decide which hypothesis is better.

In one example embodiment of the method of the present invention, it is provided that the prespecified joint compatibility test comprises determining whether the hypothesis is less than or less than/equal to a prespecified confidence threshold, wherein, if this is the case, the prespecified joint compatibility test is deemed not to have been passed, so that further pursuit of the corresponding branch in the branch-and-bound algorithm is terminated.

This may result, e.g., in a technical advantage that the algorithm can be executed efficiently. Since implausible branches in the branch-and-bound method are not pursued further, the number of iterations of the method is significantly limited.

In one example embodiment of the method of the present invention, it is provided that the objects comprise road markings, so that a road marking on the road map is associated with a road marking on the reference road map.

This may result, e.g., in a technical advantage that particularly suitable objects can be efficiently associated.

In general, objects can be, e.g., static objects. Objects are e.g. street posts, roadway markings or guard rails. In general, all possible static objects that occur on roads can be used, in particular curbs, road signs, or speed-limiting elevations.

For example, it is provided that the digital reference road map has a quality that is identical to or higher than the digital road map.

For example, it is provided that the digital reference road map is newer and more up-to-date than the digital road map.

In one example embodiment of the method of the present invention, it is provided that it is a computer-implemented method.

Technical functionalities of the device of the present invention result analogously from corresponding technical functionalities of the method, and vice versa. This means in particular that device features result analogously from corresponding method features and vice versa.

In one example embodiment of the method of the present invention, it is provided that it the method is executed or carried out by means of the device.

An association can also be referred to as a matching.

The device is configured, for example, to execute the computer program.

The embodiments and (embodiment) examples described here can be combined with one another in any desired manner, even when this is not explicitly described.

The present invention is explained in more detail below using preferred exemplary embodiments.

DETAILED DESCRIPTION OF EXAMPLE EMBODIMENTS

Figure 1:
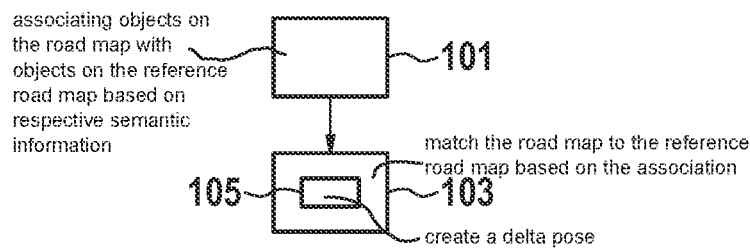
FIG. 1 shows a flowchart of a method for matching a digital road map to a digital reference road map, according to an example embodiment of the present invention.

FIG. 1 shows a flowchart of a method for matching a digital road map to a digital reference road map, wherein the two road maps in each case comprise semantic information about objects represented on the two road maps, comprising the following steps:

associating 101 objects on the road map with objects on the reference road map on the basis of the respective semantic information such that only objects with the same semantic information are associated with one another, matching 103 the road map to the reference road map on the basis of the association 101, wherein the matching 103 comprises creating 105 a delta pose between the road map and the reference road map.

Figure 2:
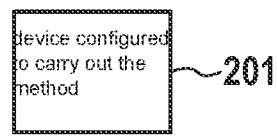
FIG. 2 shows a device according to an example embodiment of the present invention.

FIG. 2 shows a device 201 which is configured to carry out all steps of the method according to the first aspect.

Figure 3:
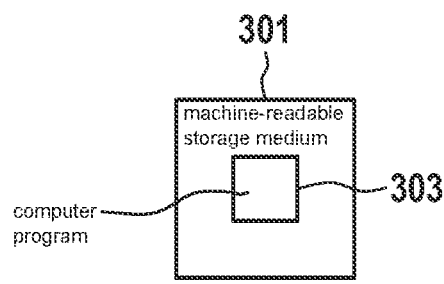
FIG. 3 shows a machine-readable storage medium, according to an example embodiment of the present invention.

FIG. 3 shows a machine-readable storage medium 301 on which a computer program 303 is stored. The computer program 303 comprises instructions which, when the computer program 303 is executed by a computer, cause the computer to carry out a method according to the first aspect.

Figure 4:
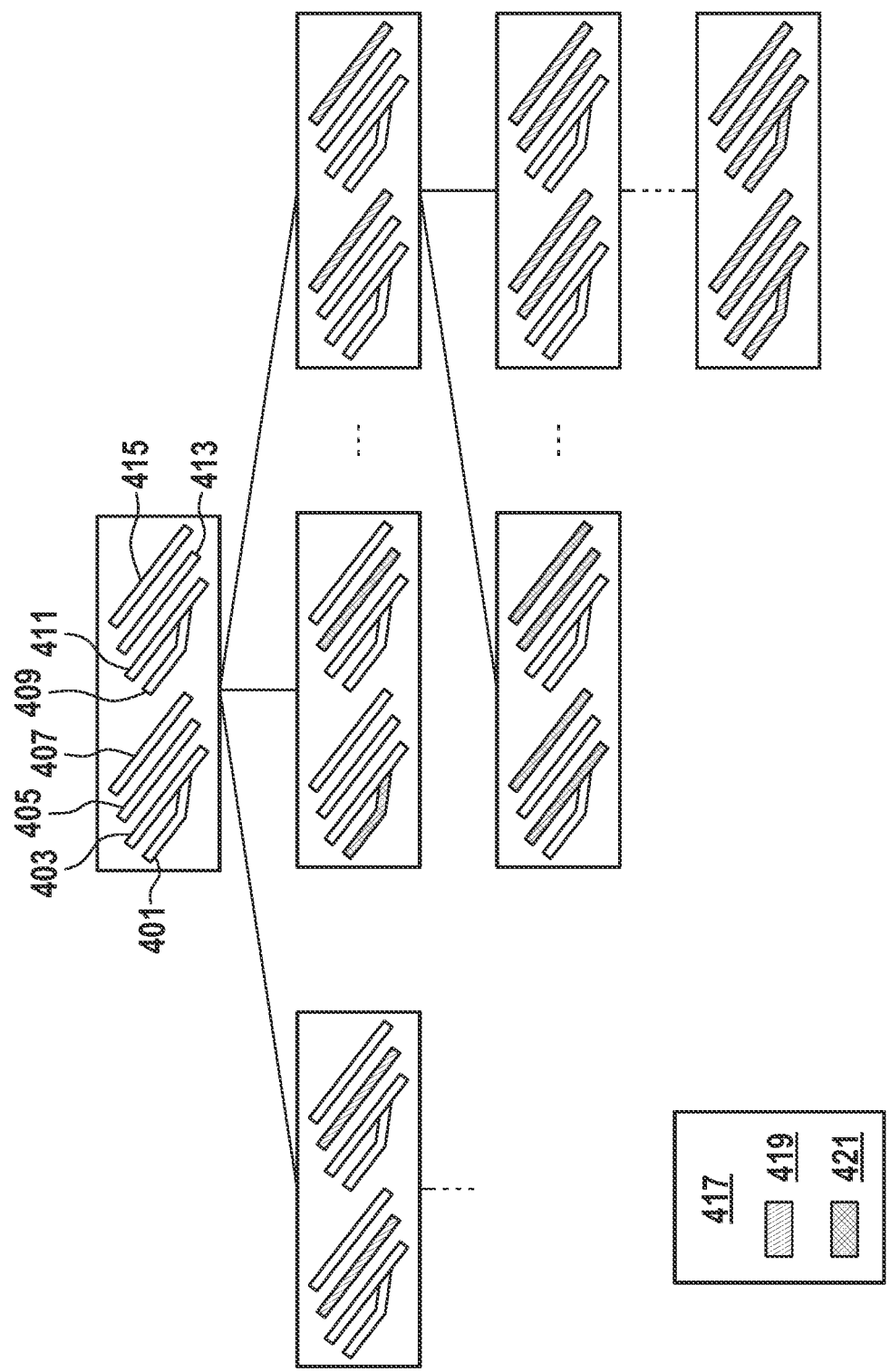
FIG. 4 shows a schematic representation of an example embodiment of a branch-and-bound-based algorithm, according to the present invention.

FIG. 4 shows a schematic representation of an embodiment of a branch-and-bound algorithm. Objects on a digital road map are matched to objects on a digital reference road map.

With regard to the digital road map, a first lane marking 401, a second lane marking 403, and a third lane marking 405 are shown by way of example. A first road edge 407 is also shown in relation to the digital road map.

With regard to the digital reference road map, a fourth lane marking 409, a fifth lane marking 411, and a sixth lane marking 413 and a second road edge 415 are shown.

The first lane marking 401 on the digital road map corresponds to the fourth lane marking 409 on the digital reference road map. The second lane marking 403 corresponds to the fifth lane marking 411. The third lane marking 405 corresponds to the sixth lane marking 413. The first road edge 407 on the digital road map corresponds to the second road edge 415 on the digital reference road map. A plurality of branches of the algorithm are shown by way of example. Different hatchings show whether a particular matching hypothesis has passed or has not passed a joint compatibility test.

A legend 417 is shown for the sake of clarity. A hatching with the reference sign 419 represents a passed joint compatibility test. A second hatching with the reference sign 421 represents a failed joint compatibility test.

This means that the individual objects, i.e. the lane markings and the road edges, are drawn with different hatchings in the individual branches of the algorithm depending on whether they have passed or not passed.

Figure 5:
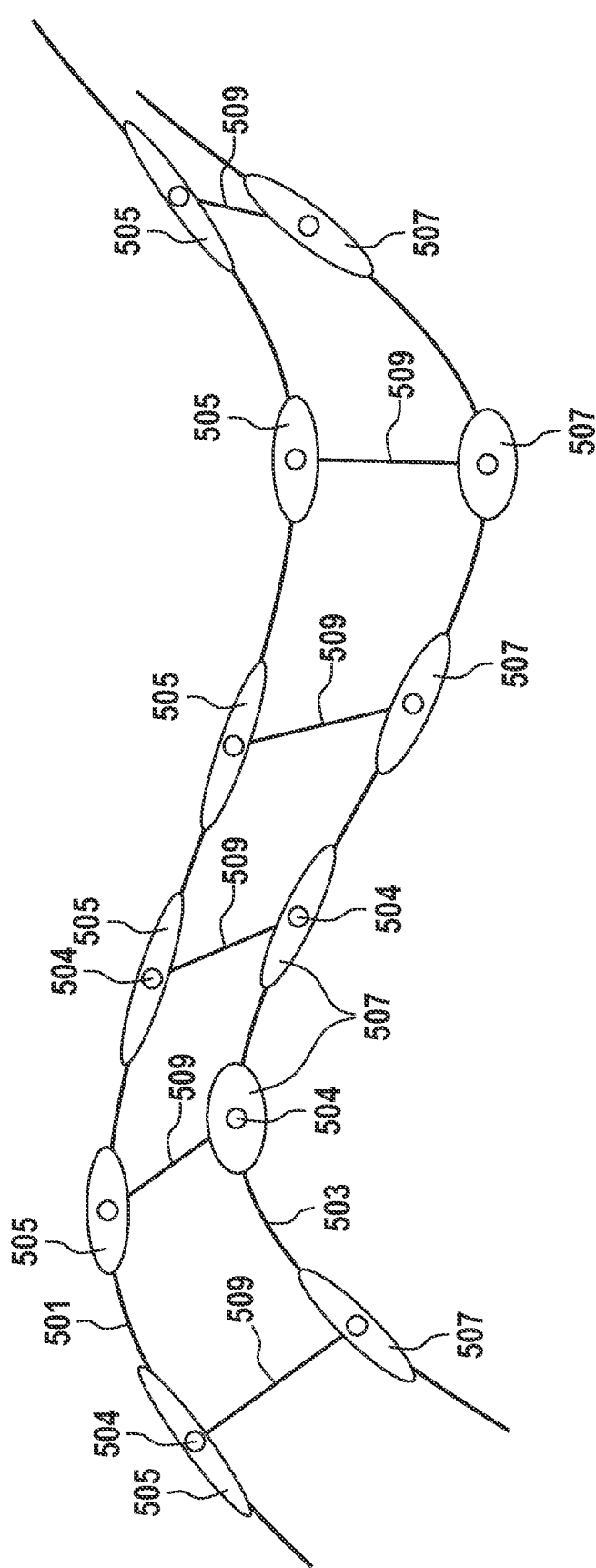
FIG. 5 shows a schematic representation of a point-matching process, according to an example embodiment of the present invention.

FIG. 5 shows a schematic representation of a point matching based on two matched lines with covariances and matching edges.

Specifically, a first roadway marking 501 on a digital road map is associated or matched with a second roadway marking 503 on a digital reference road map. In this case, the two roadway markings are shown as a polyline, i.e. as a sequence of 3d point positions.

Some of these points are denoted by reference sign 504 by way of example.

The covariances with respect to the first polyline of the first roadway marking 501 are denoted by reference sign 505.

Covariances with respect to the second polyline of the second roadway marking 503 are denoted by reference sign 507. The matching edges are denoted by reference sign 509. A covariance describes the expected or measured measurement reliability of the respective points which describe the polyline. The matching edges are the Euclidean distances between the points. These distances together with the measurement uncertainties are used for the joint compatibility test.

For example, lane matching using semantic and also geometric information is provided for matching.

The concept described here makes it possible, in particular, to carry out globally consistent matching of, for example, lanes, generally of objects, between two digital maps, wherein the matching uses not only the semantics of the lanes but also, for example, the actual geometry of the lanes. This takes place in a computationally efficient manner, since incorrect hypotheses are rejected by the branch-and-bound-based method at an early stage, for example. At the same time, for example, cardinality is built up incrementally by the matching hypothesis and evaluated for global consistency for example in each step.

For example, the device receives as input a digital reference road map and a digital road map. These two maps can be, for example, extracts from a respective larger digital map. Extracts from a digital map are in turn themselves defined as a digital map within the description. The two map extracts, i.e. the digital reference road map and the digital road map, have errors, for example. They contain the geometric information of the roadway marking represented as a polyline (a sequence of 3d-point positions), and also the semantic meaning of the line. Firstly, for example, possible matches are roughly predetermined. Lines can be associated, for example, only if the average distance between them does not exceed a certain threshold and their semantics are identical. Covariances for each point on a line are also calculated, for example, not only on the basis of the local direction but also, for example, on the basis of the curvature of the line at the point. The covariance is for example intentionally selected such that it is very large in the direction of the line, since the points on the line cannot be measured precisely along the line. In the next step, KD trees for example are pre-processed for the points on each individual line from the reference road map.

A KD tree is a data structure customary in computer science, which makes it possible, for example, to find the nearest neighbor(s) for a point in a point cloud. Here, pre-processing means that the KD tree is calculated once before the branch-and-bound method is started, so that this data structure does not have to be newly applied in each iteration, which saves computing capacity.

For example, the branch-and-bound method is then initiated; for example, individual line pairs are selected from the reference road map and the road map. For example, the individual points on the respective lines are matched with one another by means of a nearest neighbor search, wherein, for example, the KD tree of the line from the reference map does not have to be recalculated every time, since it has already been pre-calculated or pre-processed for example. A joint compatibility (JC) test is performed for each pair, for example. If, for example, the hypothesis passes the joint compatibility test, the branch and bound method will be performed for this hypothesis, for example; if not, this branch will be abandoned in the branch-and-bound process, for example. In the next step, for example, the hypotheses are expanded by a line pair and, for example, a joint compatibility test is carried out again for the entire hypothesis. The method terminates, for example, when the entire tree has been explored.

The method is not necessarily focused on lines, for example point-like features such as posts or planes, etc. can be used. A mixed use of geometry types is also possible, for example.

For example, the maps do not have to be generated from camera data, but can also originate from other sensors (e.g. lidar, radar).

The joint compatibility test can be exchanged, for example, for other methods in order for example to evaluate the global consistency of the hypothesis, e.g. a non-linear optimization. Alternatively or in addition to the joint compatibility test, other tests can be provided. For example, an average distance between the associated points on the polylines can be considered or analyzed. In this case 'considered' means, in particular, calculated and used in order to decide whether the hypothesis is to be rejected. For example, the average distance is 0.4 m for the hypothesis. A limit or a threshold value can then be defined, for example, so that only hypotheses of which the average distance is less than or less than/equal to 0.3 m are pursued in the branch-and-bound-based algorithm. This generally means that, for example, a threshold value is or will be defined, wherein only hypotheses of which the average distance between associated points on the polylines is less than or less than/equal to the defined threshold value are pursued in the branch-and-bound-based algorithm.

What is claimed is:

1. A method for matching a digital road map to a digital reference road map, wherein each respective road map of the digital road map and the digital reference road map includes respective semantic information about objects represented on the respective road map, the method comprising the following steps:
    associating objects on the digital road map with objects on the digital reference road map based on the respective semantic information such that only objects with the same semantic information are associated with one another;
    matching the digital road map to the digital reference road map based on the association, wherein the matching includes creating a delta pose between the digital road map and the digital reference road map;
    wherein the association is carried out by running a branch-and-bound-based algorithm;
    wherein, when the branch-and-bound-based algorithm is executed, a cardinality of a matching process is increased at each iteration;
    wherein when the branch-and-bound-based algorithm is executed, it is tested whether a hypothesis passes a prespecified joint compatibility test, wherein a corresponding branch in the branch-and-bound-based algorithm is pursued based on a test result of the prespecified joint compatibility test; and
    wherein the prespecified joint compatibility test includes determining whether the hypothesis is less than or less than/equal to a prespecified confidence threshold, wherein, when this is the case, the prespecified joint compatibility test is deemed not to have been passed, so that further pursuit of the corresponding branch in the branch-and-bound algorithm is terminated.

2. The method according to claim 1, wherein each respective road map of the digital road map and the digital reference road map includes respective geometric information about the objects represented on the respective road map, wherein, based on the respective geometric information, the objects on the digital road map are associated with objects on the digital reference road map.

3. The method according to claim 1, wherein an average distance, between an object on the digital road map and an object on the digital reference road map is determined, wherein the determined average distance is compared with a prespecified distance threshold value, wherein the object on the digital road map and the object on the digital reference road map are associated only when the determined average distance is less than or less than/equal to the prespecified distance threshold value.

4. The method according to claim 1, wherein a valid hypothesis with a greatest cardinality is determined as an optimal matching result.

5. The method according to claim 1, wherein the prespecified joint compatibility test includes determining whether the hypothesis is less than or less than/equal to a prespecified confidence threshold, wherein, when this is the case, the prespecified joint compatibility test is deemed not to have been passed, so that further pursuit of the corresponding branch in the branch-and-bound algorithm is terminated.

6. The method according to claim 1, wherein the objects include road markings, so that a road marking on the road map is associated with a road marking on the reference road map.

7. A device configured to match a digital road map to a digital reference road map, wherein each respective road map of the digital road map and the digital reference road map includes respective semantic information about objects represented on the respective road map, the device configured to:
    associate objects on the digital road map with objects on the digital reference road map based on the respective semantic information such that only objects with the same semantic information are associated with one another;
    match the digital road map to the digital reference road map based on the association, wherein the matching includes creating a delta pose between the digital road map and the digital reference road map;
    wherein the association is carried out by running a branch-and-bound-based algorithm;
    wherein, when the branch-and-bound-based algorithm is executed, a cardinality of a matching process is increased at each iteration;
    wherein when the branch-and-bound-based algorithm is executed, it is tested whether a hypothesis passes a prespecified joint compatibility test, wherein a corresponding branch in the branch-and-bound-based algorithm is pursued based on a test result of the prespecified joint compatibility test; and
    wherein the prespecified joint compatibility test includes determining whether the hypothesis is less than or less than/equal to a prespecified confidence threshold, wherein, when this is the case, the prespecified joint compatibility test is deemed not to have been passed, so that further pursuit of the corresponding branch in the branch-and-bound algorithm is terminated.

8. A non-transitory machine-readable storage medium on which is stored a computer program for matching a digital road map to a digital reference road map, wherein each respective road map of the digital road map and the digital reference road map includes respective semantic information about objects represented on the respective road map, the computer program, when executed by a computer, causing the computer to perform the following steps:
    associating objects on the digital road map with objects on the digital reference road map based on the respective semantic information such that only objects with the same semantic information are associated with one another;
    matching the digital road map to the digital reference road map based on the association, wherein the matching includes creating a delta pose between the digital road map and the digital reference road map;

wherein the association is carried out by running a branch-and-bound-based algorithm;

wherein, when the branch-and-bound-based algorithm is executed, a cardinality of a matching process is increased at each iteration;

wherein when the branch-and-bound-based algorithm is executed, it is tested whether a hypothesis passes a prespecified joint compatibility test, wherein a corresponding branch in the branch-and-bound-based algorithm is pursued based on a test result of the prespecified joint compatibility test; and wherein the prespecified joint compatibility test includes determining whether the hypothesis is less than or less than/equal to a prespecified confidence threshold, wherein, when this is the case, the prespecified joint compatibility test is deemed not to have been passed, so that further pursuit of the corresponding branch in the branch-and-bound algorithm is terminated.

\* \* \* \* \*